United States Patent [19]
Kamel et al.

[11] Patent Number: 5,442,920
[45] Date of Patent: Aug. 22, 1995

[54] ALTITUDE COMPENSATION FOR SPARK-IGNITED TURBOCHARGED INTERNAL COMBUSTION ENGINES

[75] Inventors: Mostafa M. Kamel; Greg A. Moore, both of Columbus, Ind.

[73] Assignee: Cummins Engine Company, Inc., Columbus, Ind.

[21] Appl. No.: 218,728

[22] Filed: Mar. 28, 1994

[51] Int. Cl.⁶ ............................................. F02D 23/00
[52] U.S. Cl. ................................................... 60/602
[58] Field of Search .................. 60/600, 601, 602, 603

[56] References Cited

U.S. PATENT DOCUMENTS

| | | |
|---|---|---|
| 1,508,707 | 9/1924 | Moss . |
| 2,374,708 | 5/1945 | Shoults . |
| 2,454,038 | 11/1948 | Crever . |
| 4,466,247 | 8/1984 | Aoki . |
| 4,468,928 | 9/1984 | Suzuki . |
| 4,476,682 | 10/1984 | McInerney . |
| 5,083,434 | 1/1992 | Dahlgren et al. ..................... 60/602 |

FOREIGN PATENT DOCUMENTS 5125949  5/1993  Japan ..................... 60/602

Primary Examiner—Richard A. Bertsch
Assistant Examiner—Charles G. Freay
Attorney, Agent, or Firm—Woodard, Emhardt, Naughton, Moriarty & McNett

[57] ABSTRACT

A computer controlled, spark-ignited, turbocharged internal combustion engine has stored in memory, turbocharger compressor outlet absolute pressure for desired engine performance throughout the engine speed range at sea level (760 mm. $H_g$) ambient pressure engine operating conditions. A sensor responsive to absolute pressure at the turbocharger compressor outlet continuously monitors the absolute pressure and compares it with the stored pressure for the engine speed at which the engine is operating at any particular time. When there is a difference, the computer responds to hold or change the waste gate position such as to hold or change the boost to re-establish the same compressor outlet absolute pressure as was stored for that engine speed under sea level ambient conditions.

19 Claims, 5 Drawing Sheets

5,442,920

ALTITUDE COMPENSATION FOR SPARK-IGNITED TURBOCHARGED INTERNAL COMBUSTION ENGINES

BACKGROUND OF THE INVENTION

This invention relates in general to a control system for all internal combustion (I.C.) engine with turbocharger, and more specifically to a system to avoid power loss with increasing altitude of engine operation.

DESCRIPTION OF THE PRIOR ART

In the operation of spark-ignited, Otto-cycle, reciprocating engines, decreasing air density at higher altitudes would normally result in reduction of available power. Several systems have been devised to compensate for this. For example, in U. S. Pat. No. 4,468,928 issued Sep. 4, 1984 to Suzuki, a waste gate valve 3 is controlled by an actuator 40 ill response to a combination of turbocharger discharge pressure and a controlling pressure which is derived from a combination of the turbocharger discharge pressure and turbocharger inlet pressure. In the FIG. 3 embodiment, gas originally stored at sea level pressure in bellows 36, pneumatically initiates the compensation. In the FIG. 4 embodiment, an ambient pressure sensor electrically controls the duty cycle of a solenoid valve, for compensation.

The McInerney Pat. No. 4,476,682 issued Oct. 16, 1984 employs a waste gate valve 32 normally biased closed by spring 42 but with compressor discharge pressure in line 44 applied to diaphragm 38 to bias the valve 32 toward the open condition. An altitude compensator bleed valve assembly 50 includes a valve 58 normally closed on the seat 60 to enable full compressor discharge pressure in line 44 to be applied to open the waste gate valve 32. But when the atmospheric pressure drops, the bellows 52 is able to expand to open valve 58 and thereby bleed sufficient pressure downstream from the restriction 46 to lower the waste gate opening pressure, thereby allowing the waste gate to remain closed longer and thus compensate for lower ambient pressure at greater altitudes.

In the Aoki Pat. No. 4,466,247, an electric heater 17 in chamber 13 is energized in response to a low atmospheric pressure in chamber 13 sensed by the pressure transducer 16. As the bellows 15 expands in response to lower atmospheric pressure, the electrical circuit will cause the heater 17 to turn on and thereby raise the pressure in chamber 13 and assist the spring 14 in keeping the waste gate 7 closed.

SUMMARY OF THE INVENTION

Described briefly, for altitude compensation according to the present invention in a spark-ignited, turbocharged internal combustion engine, a sensor responsive to absolute pressure from the turbocharger compressor outlet is used to provide a signal to the engine controller for ultimately avoiding premature opening of the turbocharger waste gate when the engine is operated at altitudes above sea level. More specifically, in such an engine equipped with an electronic engine controlling digital computer, a "map" of the compressor outlet absolute pressures required to achieve desired engine performance (particularly a desirable torque curve through all engine operating speeds), at sea level atmospheric pressure (760 mm $H_g$; 29.92 PSIA), is stored in the computer memory. An absolute pressure sensor is employed to sense the absolute pressure from the compressor outlet so that, when the engine is operated under ambient pressure conditions less than at sea level (higher altitudes, for example), the absolute pressure sensor continuously senses the absolute compressor outlet pressure developed by the turbocharger and applies a corresponding signal to a control loop in the computer which compares that pressure with the stored pressure for the particular engine speed at the time and determines whether and how much the waste gate should be opened. Accordingly, by comparing the absolute compressor outlet pressure with the stored value for the engine speed at the moment, the system will leave the turbocharger waste gate closed to enable the turbocharger to provide the same boost at higher altitudes as would be supplied at sea level conditions.

DESCRIPTION OF THE PREFERRED EMBODIMENT

Figure 1:
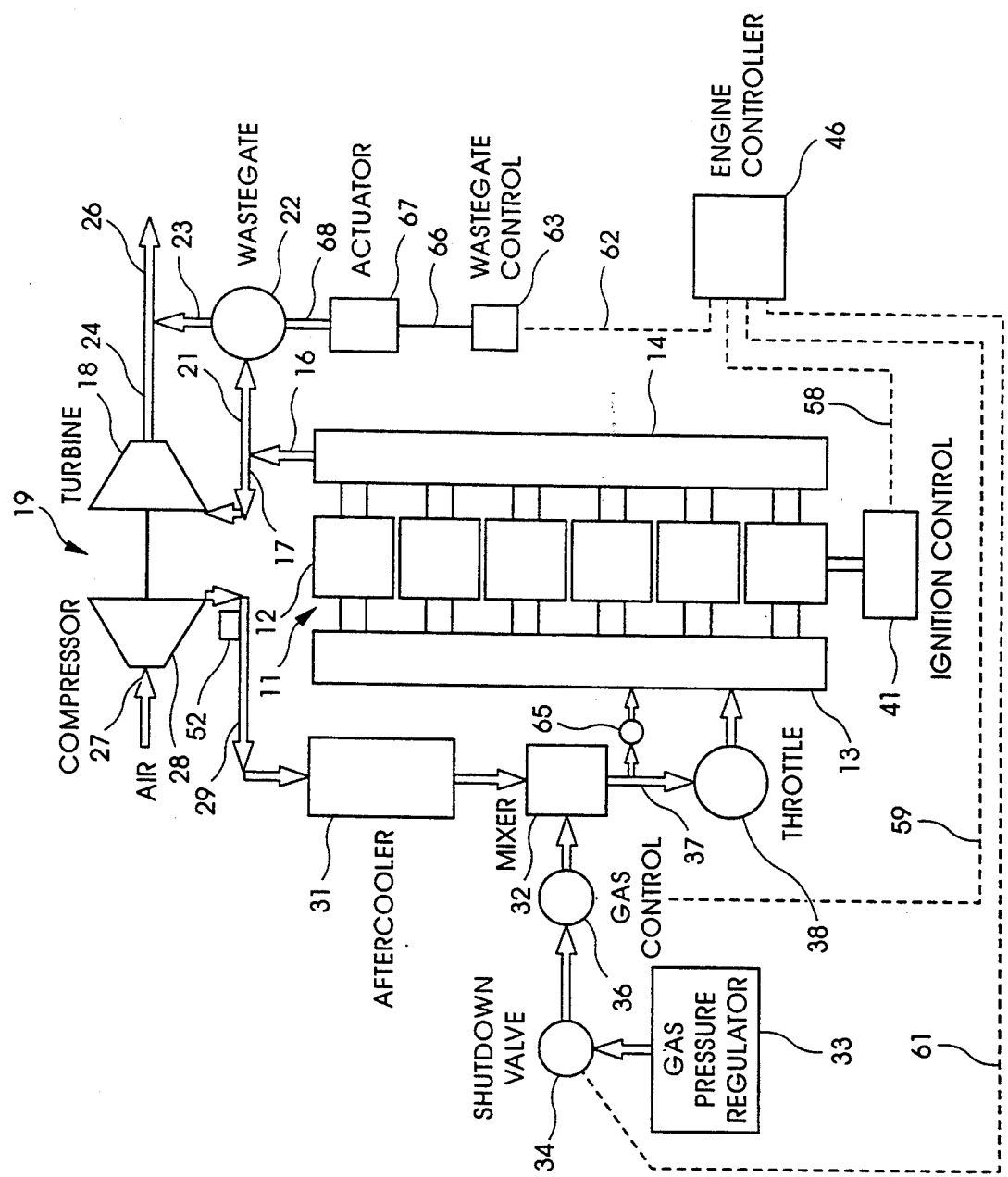
FIG. 1 is a diagram of an engine system incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, the diagram represents in a general way, a typical air/fuel and exhaust control system with a microprocessor-based electronic engine controller for a turbocharged internal combustion engine. The engine 11, illustrated schematically, includes six cylinders 12 supplied with an air-fuel mixture from intake manifold 13, and discharging combustion products through exhaust manifold 14. The exhaust manifold discharges through passageway 16 and passageway 17 into the turbine 18 of turbocharger 19. A turbocharger bypass route is provided from passageway 16 through passage 21 and the waste gate valve 22 and passageway 23. The turbocharger discharges exhaust gas from the turbine through exhaust passage 24 to exhaust pipe 26 to which the bypass 23 from waste gate 22 also discharges.

Ambient air enters the turbocharger compressor inlet at 27 and is compressed by compressor wheel 28 and discharged through passage 29 through aftercooler 31 and then to mixer 32.

The fuel for this engine is natural gas supplied from a tank (not shown) through a pressure regulator 33, shutdown valve 34, and flow control valve 36 to the mixer 32. At the mixer, the air and gas are mixed and supplied through line 37 and throttle valve 38 to the intake manifold 13.

Figure 2:
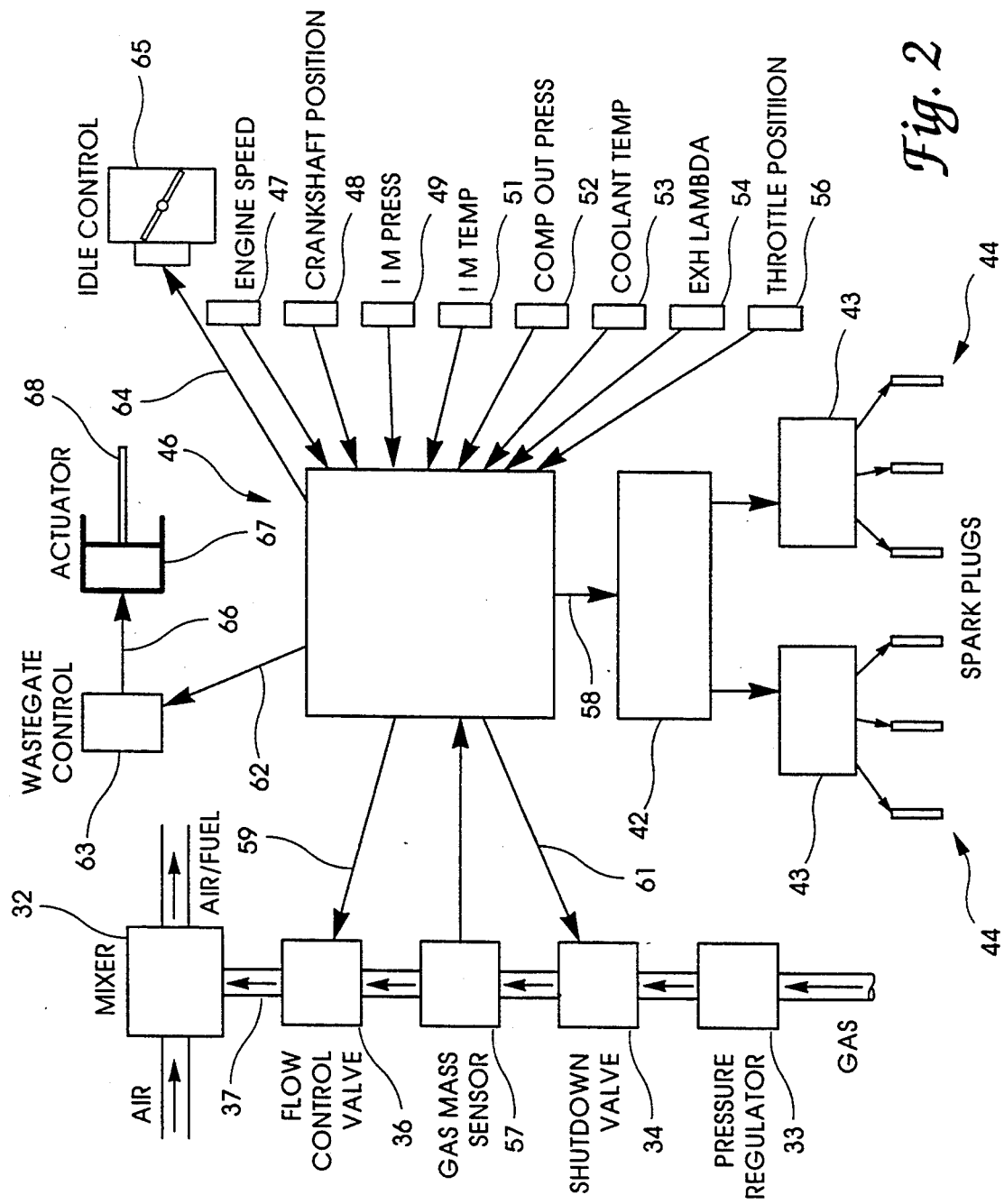
FIG. 2 is a block diagram of tile electronic control portion of FIG. 1.

Ignition control 41 shown generally in FIG. 1 may include the ignition control module 42 in FIG. 2 and coil packs 43 providing outputs to the spark plugs 44.

The engine controller 46 is shown in FIG. 1 with output signal lines to certain system components designated by dashed lines. The controller 46 includes a program ROM, RAM, analog I/O, digital I/O and microprocessor. An example of such a controller is the CM420 engine control module marketed by the Cummins Engine Company, Inc. of Columbus, Ind., U.S.A. As indicated in FIG. 2, the controller 46 receives sensory input signals from a variety of engine sensors, and produces output control signals that control several engine operating functions.

The input signals from designated sources are engine speed 47, crank shaft position 48, intake manifold pressure 49, intake manifold temperature 51, turbocharger compressor output pressure 52, coolant temperature 53, exhaust lambda 54 and throttle position 56. An input designated at the left-hand side is the gas mass sensor input 57, sensing gas flow to the flow control valve 36. The output signal lines include 58 to the ignition control module, 59 to the flow control valve, 61 to the shutdown valve, 62 to the waste gate control 63, and 64 to the idle control 65. The waste gate control 63 can include a valve electrically-operated by a signal on line 62 from controller 46 to influence a pneumatic control line 66 to cause pneumatic actuator operating the rod 68 to open and close the waste gate. At this point, and for the purposes of the present invention, it is important to emphasize that the compressor output pressure signal at line 52 represents the absolute (not gauge) pressure detected by sensor 52 at the compressor output conduit 29 (FIG. 1). The ambient pressure at sea level is normally 760 mm $H_g$. The lambda signal is representative of the ratio of the actual air/fuel ratio to the stochiometric air/fuel ratio.

Figure 3:
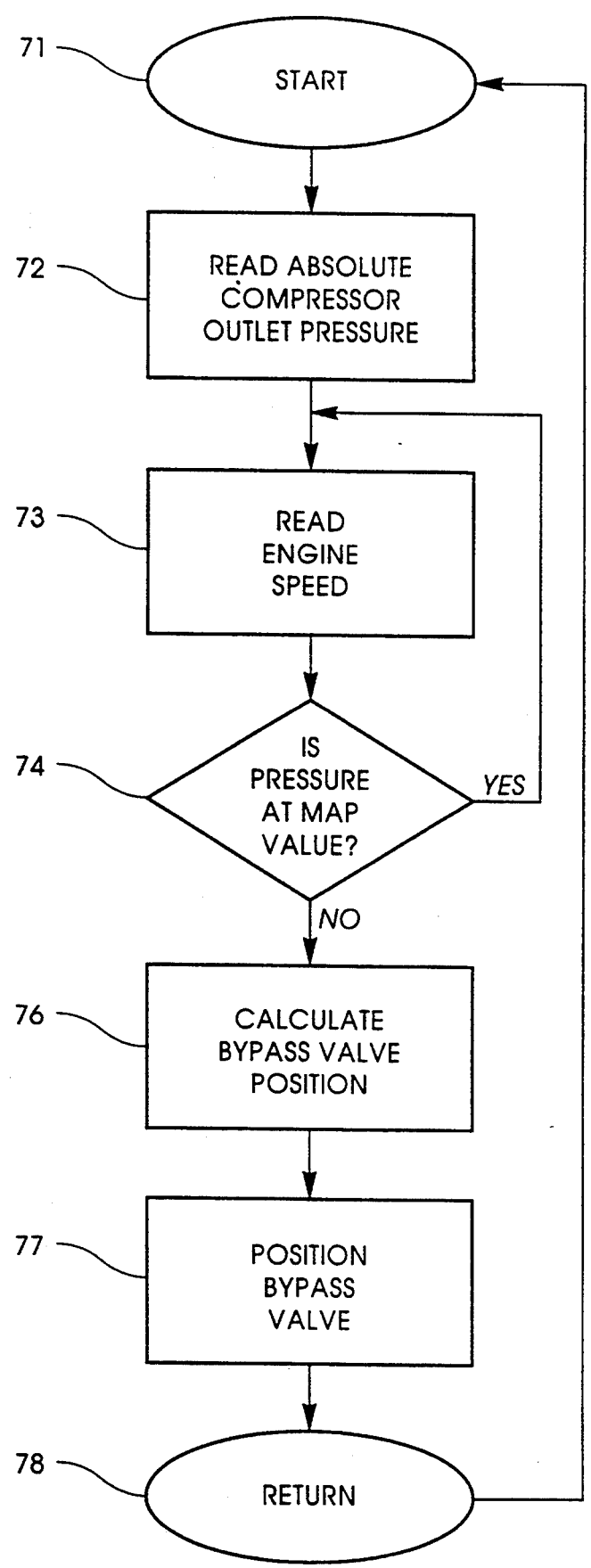
FIG. 3 is a flowchart of the control subroutine executed by the electronic control of FIG. 2 implementing the invention.

Referring now to FIG. 3, the flow chart of the subroutine in the computer 46 implementing the present invention is illustrated. After the start of the sequence, designated by block 71, absolute pressure from the compressor outlet sensor 52 is read in block 72 and stored with the engine speed input from sensor 47, this step being designated at block 73, and this information is compared in block 74 with the stored value for absolute compressor outlet pressure at that engine speed for normal sea level ambient pressure conditions (760 mm $H_g$). If there is a difference, a calculation is made to change the waste gate position in the direction indicated for correction, producing a signal out indicated by block 77 to the waste gate control 22 to change the position of the waste gate. The reading and comparison procedure is constantly repeated, and control output may be a rate of 20 Hz, for example.

At altitudes above sea level, where ambient pressure is less than 760 mm $H_g$ (29.92 PSIA) the shored value would tend to be higher than sensed value, so the "NO" output from block 74 will usually result in the waste gate remaining closed until operating conditions change such that the sensed pressure at any time exceeds the stored value for the engine speed at that time. Operation below sea level (in desert valleys, for example) could easily result in the sensed pressure exceeding stored value, and the controller 46 responding by opening the waste gate.

Figure 4:
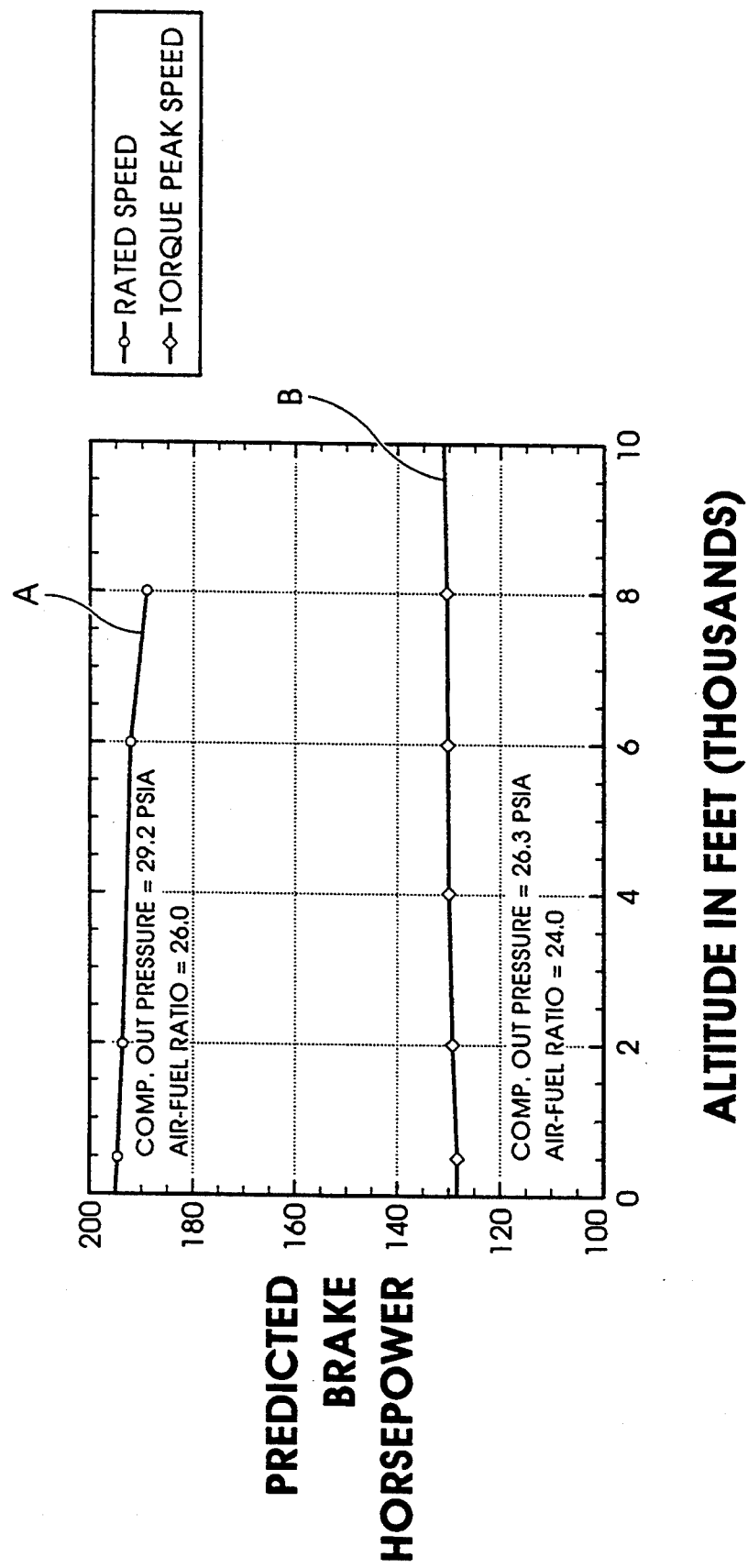
FIG. 4 is a chart showing the engine output power as influenced by altitude change when compensation is provided according to the present invention.

Referring now to the chart in FIG. 4, there is illustrated the result of an engineering computer engine simulation predicting brake horsepower output for the Cummins Engine Company 6BG engine incorporating the present invention at altitudes ranging from sea level to 10,000 feet. In the chart, for the engine operating speed at which the ("rated") engine horsepower is achieved at sea level atmospheric pressure (760 mm $H_g$), the line A represents the computer predicted brake horsepower output at altitudes from sea level to 8,000 feet, using the present invention. It illustrates that for this "rated" engine speed, the present invention enables horsepower to be maintained within 3% of the sea level value up to 8,000 feet.

In the FIG. 4 chart, and for the engine speed at which peak torque is obtained at sea level atmospheric pressure, line "B" represents the power output predicted with the present invention at altitudes from sea level to 10,000 feet. The indication is that, with the use of the present invention, the engine power output may be maintained within $\pm$ 2% of the sea level value.

From the foregoing description, it should be evident that, during normal operation, the position of the waste gate is calculated by the electronic control unit 46 to regulate exhaust flow through the turbocharger. The position is calculated to optimize the air manifold pressure and subsequent air mass in the combustion chamber for optimum engine output. Where the engine is in a vehicle and running at some throttle position providing the desired road speed, as altitude changes (on a long up-grade, for example), the engine controller continually reads the absolute compressor outlet pressure. It compares this reading to stored values for the same engine operating conditions at sea level, and adjusts the turbocharger waste gate to supply the same boost as would be applied at sea level conditions. Accordingly, by using this technique, the available intake manifold pressure is virtually immunized from any influence of change in ambient pressure with altitude. Therefore, the engine has the same available power at the various altitudes.

Figure 5:
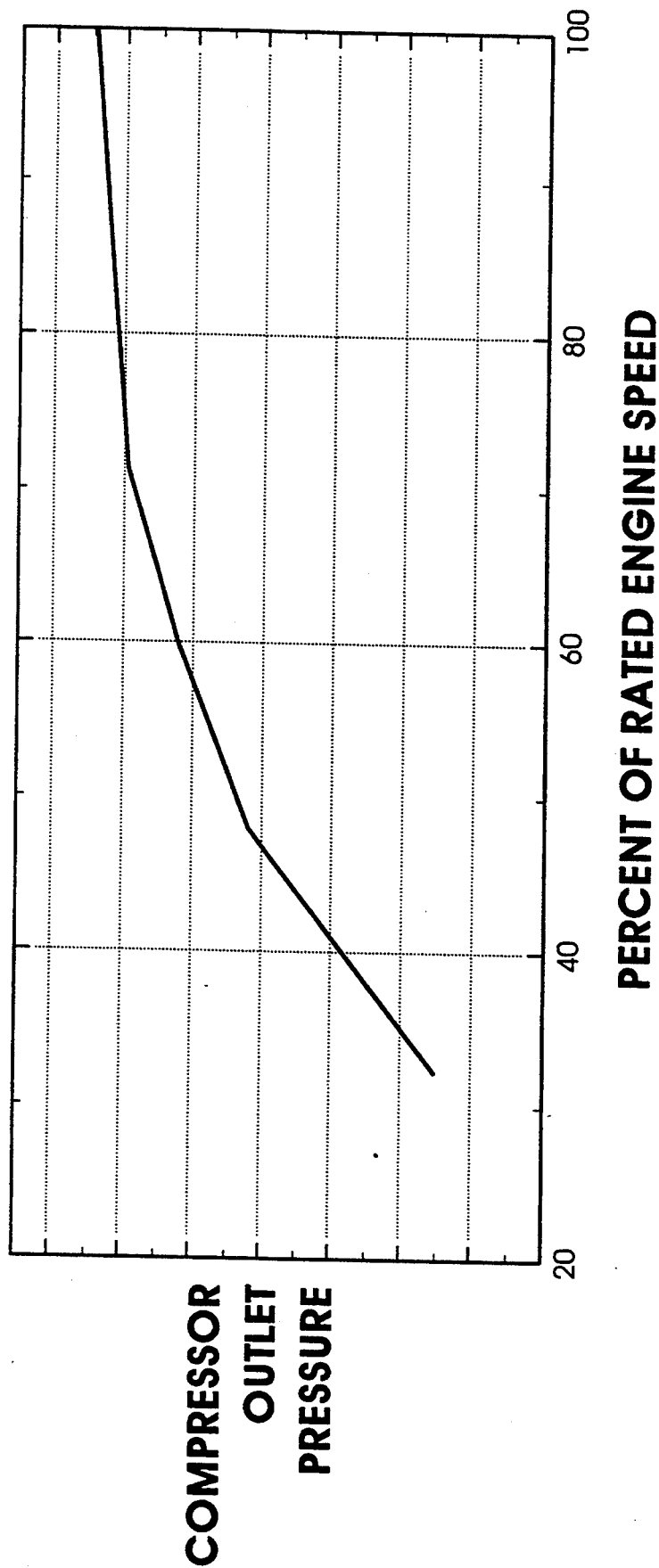
FIG. 5 is a plot showing a "map" of compressor outlet pressure related to engine speed.

FIG. 5 is a plot representing a "map" of desired sea level compressor outlet absolute pressures to obtain the desired wide open throttle torque curve throughout a range of speeds expressed as a percentage of (normalized to) rated engine speed. This is the information stored in the computer to provide the base for the comparison (block 74 in FIG. 3). Since rated engine speed is established by engineering to avoid engine damage which could result from overspeeding, and the controller 46 continuously samples and responds to differences from the map, the controller automatically limits the absolute compressor outlet pressures throughout the range of engine speeds. If the compressor outlet absolute pressure (boost) is below the limit for a particular engine operating speed, the waste gate remains closed. If the boost at a particular speed starts to exceed the stored value for that speed, the controller opens the waste gate enough to bring the boost back to the stored value. Thus, there is an upper limit on boost for all engine speed conditions, regardless of throttle position, but the waste gate is opened only if the boost exceeds the stored value. Therefore, while the present invention compensates for reduced air density, and the attendant drop in attainable boost that would normally result at higher altitudes of operation, the controller also limits boost to the shored value throughout the allowable engine speed range.

While the invention has been described as applied to a natural gas fueled engine, it could also be applied to turbocharged engines operating on other fuels. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for altitude compensation for an internal combustion engine having a turbocharger and a turbocharger bypass valve, comprising the steps of:

storing the turbocharger compressor output absolute pressure value which exists when the engine produces a desired power output at a predetermined ambient pressure;

storing the engine speed at which the desired power output is produced at said predetermined ambient pressure;

sensing the compressor output pressure during operation at ambient pressure which is different from said predetermined pressure;

taking the sensed output pressure and comparing with the stored output pressure value;

responding to the result of the comparison to maintain the turbocharger bypass valve in the position necessary to maintain the output pressure at the stored absolute pressure value.

2. The method of claim 1, and further comprising the steps of:

storing one set of values of the compressor output absolute pressure which exist for maximum engine output torque demand in said predetermined ambient pressure, throughout a range of engine operating speeds between idle and that at which maximum horsepower is produced in said ambient pressure;

during operation at ambient pressure different from said predetermined pressure, sensing engine operating speed and compressor output absolute pressure;

comparing the sensed absolute pressure with the stored compressor output absolute pressure value for that operating speed;

responding to the result of that comparison to change the bypass valve position toward that which will achieve the output absolute pressure value stored for that speed.

3. The method of claim 2 and further comprising the step of:

establishing the predetermined pressure at about sea level absolute ambient pressure.

4. The method of claim 2 for an engine with a throttle and wherein:

the step of storing compressor air output absolute pressure is at wide-open throttle condition demanding maximum engine output.

5. An apparatus for altitude compensation for an internal combustion engine having a turbocharger with an exhaust inlet and an exhaust outlet, and the turbocharger having an air inlet and a compressed air outlet, said apparatus comprising;

an exhaust bypass conduit with a first end and a second end, said first end connected to the exhaust inlet of the turbocharger and said second end connected to the exhaust outlet of the turbocharger;

an electronic engine-controller coupled to the conduit for controlling exhaust gas flow through said bypass conduit, the controller storing turbocharger compressor air outlet absolute pressure as a function of engine speed for engine operation at predetermined ambient air pressure condition; and a compressor air outlet absolute pressure sensor coupled to the controller;

the controller comparing sensed compressor air outlet absolute pressure with stored air outlet absolute pressure at said ambient conditions at various engine speeds for desired engine power, and responding to the comparison to change flow of exhaust gas in the bypass conduit to bring the compressor outlet pressure to the stored value for that desired engine power production.

6. The apparatus of claim 5, and further comprising:

an engine speed sensor coupled to the controller;

the controller responding to the engine speed sensor provide the engine speed information to the comparison.

7. The apparatus of claim 6, and further comprising;

a bypass valve in the exhaust bypass conduit and operable when opened to reduce flow of exhaust gas through the turbocharger.

8. The apparatus of claim 7, wherein the opening of the exhaust bypass valve is delayed in response to sensing compressor outlet absolute pressure below the stored value for the desired engine power.

9. The apparatus of claim 8, wherein the engine uses a fuel which is natural gas.

10. In a multi-cylinder, computer-controlled, spark-ignited, turbocharged internal combustion engine, a system compensating for ambient pressure changes with altitude changes and comprising the steps of:

storing in the computer, turbocharger compressor outlet absolute pressure which produces optimum engine power output for a given engine speed at sea level ambient pressure conditions;

sensing absolute compressor outlet pressure; and responding to the sensed absolute pressure to control an engine exhaust through turbocharger turbine bypass to maintain, for that given engine speed, an absolute compressor outlet pressure substantially the same as the stored pressure regardless of altitude changes.

11. The system of claim 10 and further comprising the steps of:

storing values of absolute compressor outlet pressure for the engine at sea level for various engine speed conditions;

comparing the stored value for a given power output at a given engine speed with the sensed value when that power output is desired at a different operating altitude; and responding to the difference in pressures to adjust a wastegate to change the boost pressure to supply the same boost pressure as at sea level for that power output.

12. The system of claim 11 and wherein the given power output is that at the engine speed at which peak torque is produced with maximum boost pressure.

13. The system of claim 11 and wherein the given power output is that at the engine speed at which maximum power is produced with maximum boost pressure.

14. The system of claim 11 and wherein the given power output is the rated horsepower.

15. An apparatus for altitude compensation for an internal combustion engine having a turbocharger with an exhaust inlet and an exhaust outlet, and the turbocharger having an air inlet and a compressed air outlet, said apparatus comprising:
- an exhaust bypass upstream of the exhaust inlet of the turbocharger;
- an electronic engine-controller coupled to the bypass for controlling exhaust gas flow through said bypass, the controller storing turbocharger compressor air output absolute pressure as a function of engine speed for engine operation at predetermined ambient air pressure condition; and
- a compressor air output absolute pressure sensor coupled to the controller;
- the controller comparing sensed compressor air output absolute pressure with stored air output absolute pressure at ambient conditions at various engine speeds for desired engine power, and responding to the comparison to change flow of exhaust gas through the bypass to bring the compressor output pressure to the stored value for that desired engine power production.

16. The apparatus of claim 15 and further comprising:
- an engine speed sensor coupled to the controller;
- the controller responding to the engine speed sensor to provide the engine speed information to the comparison.

17. The apparatus of claim 15 and further comprising:
- a valve in the exhaust bypass and operable when opened to reduce flow of exhaust gas through the turbocharger.

18. The apparatus of claim 15 and wherein: the controller stores output absolute pressures for engine operation for maximum engine output torque demand through a range of engine speeds.

19. The apparatus of claim 18 for an engine having a throttle and wherein:
- the controller stores output absolute pressures for engine operation under maximum output demand of wide open throttle.

* * * * *

UNITED STATES PATENT AND TRADEMARK OFFICE
CERTIFICATE OF CORRECTION

PATENT NO. : 5,442,920
DATED : August 22, 1995
INVENTOR(S) : Mostafa M. Kamel et al.

It is certified that error appears in the above-indentified patent and that said Letters Patent is hereby corrected as shown below:

Column 1, line 19, please change "ill" to "in".

Column 2, line 21, please change "tile" to "the".

Column 3, line 59, please change "shored" to "stored".

Column 4, line 67, please change "shored" to "stored".

Signed and Sealed this

Seventh Day of November, 1995

Attest:

BRUCE LEHMAN

Attesting Officer

Commissioner of Patents and Trademarks